Figure 1:
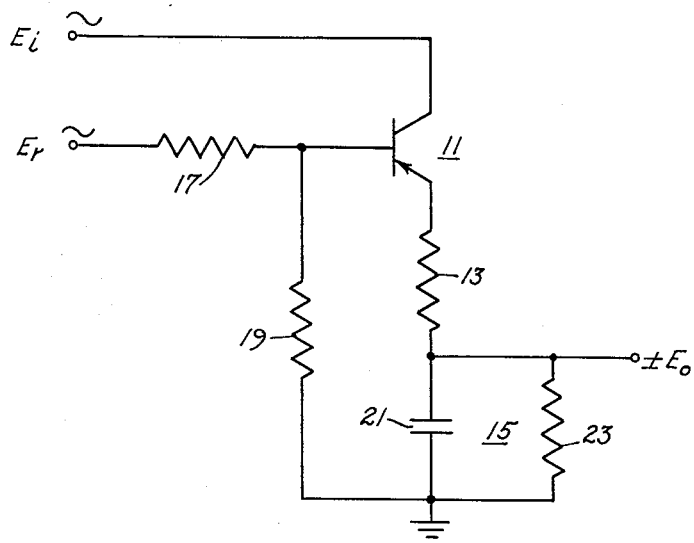

Dec. 5, 1961　　　G. M. FORD　　　3,012,182
TRANSISTOR SYNCHRONOUS RECTIFIER
Original Filed Aug. 15, 1957

INVENTOR.
GERALD M. FORD
BY
H. H. Loesche
ATTORNEYS

United States Patent Office 3,012,182
Patented Dec. 5, 1961

3,012,182
TRANSISTOR SYNCHRONOUS RECTIFIER
Gerald M. Ford, Santa Monica, Calif., assignor to the United States of America as represented by the Secretary of the Navy
Original application Aug. 15, 1957, Ser. No. 678,459, now Patent No. 2,930,984, dated Mar. 29, 1960. Divided and this application May 28, 1959, Ser. No. 816,652
3 Claims. (Cl. 321—47)
(Granted under Title 35, U.S. Code (1952), sec. 266)

The invention described herein may be manufactured and used by or for the Government of the United States of America for governmental purposes without the payment of any royalties thereon or therefor.

This application is a division of my application, Serial No. 678,459, filed August 15, 1957, now United States Patent No. 2,930,984 granted March 29, 1960, and relates generally to demodulators and more specifically to synchronous rectifiers incorporating transistor switching means.

It has been the practice in the art involving choppers and demodulators that, in such apparatus, the elements utilized for converting alternating current (A.C.) voltage into a direct current (D.C.) output signal have been electromagnetically actuated mechanical vibrators, or switches, operated synchronously from a source of A.C. reference voltage common to both the chopper and demodulator. Certain disadvantages have been associated with use of these devices. For example, the inertia of the vibrating element of these units is such that any change in operating frequency necessarily introduces a corresponding shift in the phase of the output signal precluding their use in systems where the operating frequency is subject to variation. Moreover, electromagnetically actuated switches also have low reliability factors as the result of mechanical wear and the degeneration of electrical contacts. In the instant invention the aforestated disadvantages of the prior art are avoided through the use of a semiconductor switching element in a synchronous rectifier unit.

In accordance with a typical embodiment of this invention, a synchronous rectifier, incorporating a transistor, is operative in response to an A.C. reference voltage for changing an A.C. input voltage into a D.C. output signal. The novel synchronous rectifier of this invention may comprise a semiconductor switch having a bidirectionally conductive path coupled in series with a resistance capacitance network between a source of A.C. signal to be rectified and a ground source of constant reference potential. A source of A.C. reference voltage is applied to the switch to control the opening and closing of the bidirectional path, and the unidirectional output potential is developed across the network.

The objects of the invention are as follows:
(1) To provide an inertialess, variable frequency, small, light weight, reliable, electronic, synchronous rectifier.
(2) To provide an electronic synchronous rectifier requiring only a single semiconductor as a switching element.

Figure 2A:
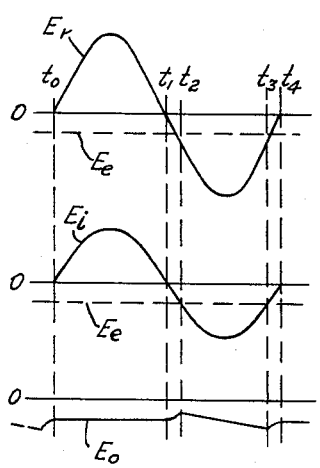
Figure 2B:
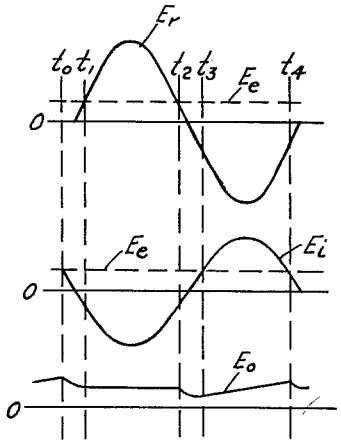

It is probable that additional objects and features of the invention will become apparent after reference to the following detailed description made in conjunction with the accompanying drawings wherein:

FIG. 1 represents an embodiment of a novel synchronous rectifier as utilized in the invention, FIG. 2A represents reference voltage, input voltage, and D.C. output potential fluctuations for the embodiment of FIG. 1 when the waves of the reference voltage $E_r$ and the waves of the input voltage $E_i$ are in phase, and FIG. 2B represents the reference voltage, input voltage, and output voltage variations for the embodiment of FIG. 1 at a time when the waves of the reference voltage $E_r$ and input voltage $E_i$ are one hundred eighty degrees out of phase.

As is well understood in the art, a transistor is a semiconductive body having a region of one conductivity type usually sandwiched between two regions of the opposite conductivity type. A large area metallic connection to the middle region is called the base electrode while similar connections to the end regions are called the emitter and collector electrodes, respectively. A unique characteristic of the transistor which makes it especially useful for switching purposes is its capacity to conduct current in either direction between the two end regions, depending, of course, upon the polarity of the bias potentials applied thereto. The middle region of the transistor, for example, may function as a switch blade. Thus, when a potential having the polarity normally required to interrupt the conductive path between the emitter and collector is applied to the base of the transistor, and the magnitude of this potential is greater than the magnitude of the greatest potential of the same polarity applied either to the emitter or collector, conduction through the transistor ceases, thereby effectively opening the switch. Conversely, whenever the magnitude of the base potential drops below that of a potential of the same polarity applied to the collector or emitter, or whenever a potential of the opposite polarity is applied to the base, the conduction through the transistor is restored, thereby effectively closing the switch.

The embodiment of the novel synchronous rectifier, FIG. 1, comprises a transistor 11 of the P–N–P type having its collector electrode coupled to a source of A.C. input signal $E_i$, its emitter coupled through a resistor 13 and the resistance-capacitance network 15 to a ground source of constant reference potential, and its base electrode coupled to a point common to series connected resistors 17 and 19. The series connected resistors 17 and 19 form a voltage divider between a source of A.C. reference voltage $E_r$ and a ground source of constant reference potential. The resistance-capacitance network 15 comprises capacitor 21 and resistor 23 coupled in parallel. The D.C. output signal $\pm E_o$ is taken from a point common to resistor 13 and the network 15.

The input and output signal waveforms for two conditions of operation of the synchronous rectifier of FIG. 1 are represented in FIG. 2A and FIG. 2B. As shown in FIG. 2A, a D.C. output signal $E_o$ of negative polarity is produced when the A.C. input signal $E_i$ is in phase with the A.C. reference voltage $E_r$. On the other hand, when the A.C. input signal is one hundred eighty degrees out of phase with the A.C. reference voltage $E_r$, a D.C. output signal $E_o$ of positive polarity is produced. The waveforms for the latter are represented in FIG. 2B. It should be noted that the A.C. input signal $E_i$ and the A.C. reference voltage $E_r$ must always be related in phase by an integer multiple of one hundred eighty degrees, integer being understood to include zero as well as all whole numbers.

Consider the operation of the synchronous rectifier of FIG. 1, as shown in FIG. 2A when the A.C. input signal $E_i$ is in phase with the A.C. reference voltage $E_r$. Assume that capacitor 21 is charged to a negative potential having a magnitude slightly less than that of the maximum amplitude of the negative half cycle of A.C. input signal $E_i$. This potential is represented approximately in FIG. 2A, for explanatory purposes, by the dotted horizontal lines designated $E_e$. It is an important feature of this invention that the maximum amplitudes of the A.C. reference voltage $E_r$ be greater than the corresponding maxima of the A.C. input signal $E_i$. As shown in FIG. 2A, both $E_i$ and $E_r$ begin positive half cycles at time $t_0$. During the entire positive half cycle the potential applied to the base electrode of transistor switch 11 is always biased positive with respect to the potentials present on the emitter and collector electrodes and, as a result, transistor switch 11 is open; current cannot flow between the emitter and collector electrodes in either direction, and the D.C. output signal $-E_o$ remains constant, as shown in the bottom curve of FIG. 2A.

At time $t_1$ the negative half cycles of $E_r$ and $E_i$ begin. At this instant the negative potential $E_e$ exists on the emitter electrode of transistor switch 11 because of the negative charge stored on the upper plate of capacitor 21. As $E_r$ and $E_i$ become more negative during the interval between $t_1$ and $t_2$, the potential $E_r$ on the base electrode becomes negative more rapidly than the potential $E_i$ on the collector electrode, and the pre-existing potential on the emitter electrode $E_e$, established by the charge remaining in capacitor 21, is more negative than either $E_r$ or $E_i$. As a result, the collector electrode is positive relative to the emitter electrode, and there is an inverse flow of electron current from emitter to collector. Consequently, there is a partial discharge of capacitor 21 through resistor 13. The discharge of capacitor 21 is represented by the slight rise in the waveform of the D.C. output signal $-E_o$, shown in FIG. 2A between $t_1$ and $t_2$.

When, at time $t_2$, the amplitude of $E_i$ becomes equal to the magnitude of the pre-existing negative potential $E_e$ on the emitter, the collector electrode becomes relatively more negative than the emitter electrode and electron current begins to flow in the normal direction from collector to emitter, thereby again charging capacitor 21 and causing the magnitude of D.C. output signal $-E_o$ to become more negative, as represented between times $t_2$ and $t_3$ in the lower waveform of FIG. 2A.

At time $t_3$ the amplitude of the negative half cycle of $E_i$ has diminished to the level where the potential on the emitter electrode of transistor switch 11 is once again more negative than that applied to the collector electrode, and inverse electron current through the switch again discharges capacitor 21. The discharge continues until a new positive half cycle is initiated at time $t_4$. At this instant a new cycle operation of the synchronous rectifier begins and proceeds in the manner just described.

The voltage relationship of the synchronous rectifier of FIG. 1 when $E_r$ and $E_i$ are out of phase is represented in FIG. 2B. Under this condition of operation, the synchronous rectifier produces a D.C. output signal $E_o$ of positive polarity. Assume that capacitor 21 has a positive charge on its upper plate slightly less than the maximum positive amplitude of the A.C. input signal $E_i$ and that the maximum amplitudes of the A.C. reference voltage $E_r$ are greater than those of the $E_i$. The latent positive charge on capacitor 21 establishes a positive potential $E_e$ on the emitter electrode of transistor switch 11, approximated, for explanatory purposes, by the horizontal dotted lines of FIG. 2B.

During the time interval $t_0$ to $t_1$, the A.C. input signal $E_i$ is negative going, thereby establishing a potential on the collector which is relatively more negative than the potential $E_e$ on the emitter of transistor 11. As a result, electron current flows in the normal direction from collector to emitter and partially discharges the positive potential on the upper plate of capacitor 21, an effect represented in the bottom waveform of FIG. 2B. This discharging current continues until, at time $t_1$, the positive potential established on the base electrode of the transistor 11 by the positive going swing of A.C. reference voltage $E_r$ becomes equal to the emitter potential $E_e$, thereby causing the cessation of electron current flow by the opening of switch 11.

During the time interval $t_1$ to $t_2$ the positive swing of A.C. reference voltage $E_r$ maintains transistor switch 11 in its open position and the D.C. output signal $+E_o$ remains constant as shown in the lower waveform of FIG. 2B.

At time $t_2$, $E_r$ on its negative going downswing once more becomes relatively negative with respect to the emitter potential $E_e$. As a result, the switch is closed and electron current again flows in the normal direction from collector to emitter, thereby causing still further discharge of capacitor 21. At time $t_3$ the collector potential established by the A.C. input signal $E_i$ begins to become more positive than the emitter potential $E_e$ established by the latent charge on capacitor 21 and the switch, remaining closed on account of the negative swing of the potential on the base electrode established by A.C. reference potential $E_r$, begins to pass electron current in the inverse direction, from emitter to collector, thereby increasing the positive charge on the upper plate of capacitor 21 and causing the D.C. output signal $+E_o$ to become more positive, as shown in the lower waveform of FIG. 2B.

At time $t_4$, the potential of the emitter and collector electrodes of the transistor switch again reverses, causing electron current to flow in the normal direction and again discharging capacitor 21 in the manner described above for the time interval $t_0$ to $t_1$. Thus, the synchronous rectifier begins a new cycle of operation similar to the one just described.

Although the transistor 11 represented in the embodiment of FIG. 1 is of the P–N–P type, it should be apparent that transistors of the N–P–N type also may be used in lieu thereof. However, the use of a transistor of the N–P–N type will reverse the polarity of the D.C. output signal. It should be noted that satisfactory results may be obtained by reversing the emitter and collector connections shown in FIG. 1, notwithstanding the type of transistor utilized therein.

The details illustrated in the accompanying drawings and set forth in the foregoing description are intended merely to facilitate the practice of the invention by persons skilled in the art. The scope of the invention is represented in the following claims.

What is claimed is:

1. A synchronous rectifier for converting an alternating current input signal into a direct current output signal having a polarity representative of the phase relationship between said input signal and an alternating current reference voltage and having a magnitude representative of the amplitude of said input signal, said synchronous rectifier comprising: a transistor having collector, emitter, and base electrodes; means coupling the bidirectional collector-to-emitter path of the said transistor in series relation with the combination consisting of a first resistance coupled in series with a capacitance and a second resistance coupled in parallel with said capacitance between a source of alternating current input signal and a ground source of reference potential; means for applying an alternating current reference voltage having an amplitude greater than that of said input signal, having a frequency equal to that of said input signal, and being related in phase to said input signal by an integral multiple of one hundred eighty degrees, to the said base electrode such that said transistor is rendered conductive and non-conductive on alternate half cycles of said input signnal; and output means coupled to a common point between said first and second resistances for supplying during each successive half-cycle a continuous direct current output signal from said synchronous rectifier.

2. A synchronous rectifier for converting an alternating current input signal into a direct current output signal having a polarity indicative of the phase relationship between said input signal and an alternating current reference voltage and having a magnitude indicative of the amplitude of said input signal, said synchronous rectifier comprising: a transistor having a bidirectionally conductive path coupled in series with the combination consisting of a first resistance coupled in series with a capacitance and a second resistance coupled in parallel with said capacitance between a source of alternating current voltage and a ground source of constant reference potential;

a voltage divider made up of first and second series connected resistors coupled between a source of alternating current reference voltage having an amplitude greater than that of said input signal, having a frequency equal to that of said input signal, and being related in phase to said input signal by an integral multiple of one hundred eighty degrees, and the said ground source; means coupling a point common to the first and second resistors to a current controlling electrode of the transistor; and an output terminal means coupled to a common point between said first and second resistances for supplying during each successive half-cycle a continuous direct current output signal from said synchronous rectifier.

3. A synchronous rectifier for converting an alternating current input signal into a direct current output signal having a polarity indicative of the phase relationship between said input signal and an alternating current reference voltage and having a magnitude indicative of the amplitude of said input signal, said synchronous rectifier comprising: a transistor switch means having first and second conduction electrodes for providing a bidirectional conduction path, and a control electrode; a first terminal means for receiving an alternating current input signal coupled to said first conduction electrode; a second terminal means for receiving an alternating current reference voltage having an amplitude greater than that of said input signal, having a frequency equal to that of said input signal, and being related in phase to said input signal by an integral multiple of one hundred eighty degrees, coupled through a first resistance to said control electrode of said switch means, said control electrode being further coupled through a second resistance to ground potential whereby said first and second resistances provide a voltage dividing arrangement between said second terminal means and said control electrode; the combination consisting of a third resistance having one terminal coupled to said second conduction electrode and the other coupled through a storage means to ground potential, and a fourth resistance coupled in parallel with said storage means whereby an output means coupled across said fourth resistance supplies a continuous direct current output signal during each successive half-cycle of operation of said synchronous rectifier.

References Cited in the file of this patent

UNITED STATES PATENTS

| 2,884,545 | Houck | Apr. 28, 1959 |
| 2,898,476 | Jensen | Aug. 4, 1959 |
| 2,953,738 | Bright | Sept. 20, 1960 |

OTHER REFERENCES

"A Transistor D.C. Chopper Amplifier" by P. L. Burton, published in Electronic Engineering (August 1957), pages 393–397 relied on.